United States Patent

Kang

[11] Patent Number: 5,963,341
[45] Date of Patent: Oct. 5, 1999

[54] DEVICE FOR CHANGING RESOLUTION OF FACSIMILE

[75] Inventor: Il-Kwon Kang, Suwon, Rep. of Korea

[73] Assignee: SamSung Electronics Co., Ltd., Suwon, Rep. of Korea

[21] Appl. No.: 08/885,732

[22] Filed: Jun. 30, 1997

[30] Foreign Application Priority Data

Jun. 29, 1996 [KR] Rep. of Korea ............. 96-19354

[51] Int. Cl.$^6$ ............................................. H04N 1/36
[52] U.S. Cl. ....................... 358/451; 358/419; 358/423; 358/414
[58] Field of Search .............................. 358/400, 401, 358/412, 414, 419, 420, 421, 422, 423, 482, 483, 493, 494, 497, 498, 451

[56] References Cited

U.S. PATENT DOCUMENTS

| | | | |
|---|---|---|---|
| 3,699,249 | 10/1972 | Crane et al. | 178/6.6 R |
| 4,262,310 | 4/1981 | Vano | 358/277 |
| 5,062,006 | 10/1991 | Miura | 358/421 |
| 5,239,585 | 8/1993 | Takeuchi | 358/474 |
| 5,369,509 | 11/1994 | Ko | 358/498 |
| 5,459,588 | 10/1995 | McVicar et al. | 358/473 |
| 5,627,585 | 5/1997 | Goldschmidt et al. | 348/142 |

Primary Examiner—Jerome Grant, II
Attorney, Agent, or Firm—Robert E. Bushnell, Esq.

[57] ABSTRACT

A device for changing a resolution of a facsimile includes a pinion gear rotated by the driving power of a driving motor, a first gear for rotating a driving roller to convey a document to a contact image sensor, a second gear for changing its driving path according to a rotation direction of the pinion gear; and a third gear interlocked or separated with the first gear according to the rotation direction of the second gear. This changes the resolution. The contact image sensor reads, codes, compresses, and transmits the document data.

19 Claims, 2 Drawing Sheets

DEVICE FOR CHANGING RESOLUTION OF FACSIMILE

CLAIM OF PRIORITY

This application makes reference to, incorporates the same herein, and claims all benefits accruing under 35 U.S.C. §119 from an application entitled DEVICE FOR CHANGING RESOLUTION OF FACSIMILE earlier filed in the Korean Industrial Property Office on Jun. 29, 1996, and there duly assigned Serial No. 96-19354 by that Office.

BACKGROUND OF THE INVENTION

1. Field of the Invention

The present invention relates to a device for changing the resolution of a facsimile. More specifically, the present invention relates to a device for changing the resolution of a facsimile that converts the resolution, without a separate electrical control.

2. Description of the Related Art

A transmission process of a contemporary facsimile requires a resolution of the facsimile. In order to change its resolution, a reference resolution is mechanically realized, and then the final resolution is electrically realized. The amount of information needed is obtained from data having the original resolution, and a predetermined amount of the information is electrically added or subtracted, to thereby create a resolution different from the original. One method of electrically changing the resolution of a facsimile is disclosed in Korean Pat. No. 92-2852. This method can be summarized as follows. In case of an even mask (the mask being even) in the vertical direction, the first row of third row and third column is changed into the brightness of the first picture element, the intermediate brightness between the first and second picture elements, and the brightness of the second picture element. If the mask is also even in the horizontal direction, and the first and second picture elements are black, the second row is changed into a pattern of white, black, and white. When the mask is odd in the horizontal direction, and the first and second picture elements are black, the second row is changed into black, white, and black. When one of the first and second picture elements is not black, the second row is changed into the brightness of the first picture element, the intermediate brightness between the first and second picture elements, and the brightness of the second picture element. In such a circumstance, the third row is changed into the brightness of the third picture element, the intermediate brightness between the third and fourth picture elements, and the brightness of the fourth picture element.

Where there is an odd mask (the mask not being even) in the vertical direction, the first row of third row and third column is changed into the brightness of the first picture element, intermediate brightness between the first and second picture elements, and brightness of the second picture element. When the mask is odd in the horizontal direction, and the third and fourth picture elements are black, the second row is changed into black, white, and black. When the mask is odd in the horizontal direction, and the third and fourth picture elements are black, the second row is changed into white, black, and white. When one of the third and fourth picture elements is not black, the second row is changed into the brightness of the first picture element, intermediate brightness between the first and second picture elements, and brightness of the second picture element, and the third row is changed into the brightness of the third picture element, intermediate brightness between the third and fourth picture elements, and brightness of the fourth picture element. By doing so, the resolution is increased. Thus, the picture quality is improved.

In the method discussed in the previous paragraphs, the original data is electrically processed to form data having the needed resolution. Accordingly, the process is complicated; it is difficult to perform. Furthermore, since the electrical process requires a predetermined time and separate hardware, the facsimile cost is increased. Moreover, the resolution realized through the electrical process is poorer; it is impossible to obtain a high-resolution image.

On these matters of resolution, facsimiles, and gears, among exemplars of the contemporary art and practice, Goldschmidt et al. (U.S. Pat. No. 5,626,585, *Arrangement For High-Resolution Scanning Of Large Image Formats With Exact Geometrical Correspondence*, May 6, 1997) discusses a scanning resolution improved by using a special pixel raster method. Ko (U.S. Pat. No. 5,369,509, *Document Transferring System For A Facsimile Apparatus*, Nov. 29, 1996) discusses a document transferring system including at least two drive gears and an idler gear. Miura (U.S. Pat. No. 5,062,006, *Sheet Feeding Apparatus And Facsimile System Having Same*, Oct. 29, 1991) discusses control of a stepping motor interacting with a discrimination means. Vano (U.S. Pat. No. 4,262,310, *Facsimile Recorder Framing Circuit*, Apr. 14, 1981) discusses transmitting power to the recorder motor at a particular frequency. Takeuchi (U.S. Pat. No. 5,239,393, *Image Reading Apparatus*, Aug. 24, 1993) discusses a reading device for reading an image line by line. Upon reception of the image reading resumption signal generated from the computer, the driving force initiates supply of the driving signal to the moving device. Crane et al. (U.S. Pat. No. 3,699,249, *Facsimile Systems, Transceivers, And Marking Transducers Therefor*, Oct. 17, 1972) discusses a transceiver including rotary members which rotate past an arcuately disposed document to transmit the information on the document or to receive and record facsimile information on the document. The transceiver has a transducer. From my study of the contemporary practice and art, I find that there is a need for an improved and effective device for changing the resolution of a facsimile that converts the resolution, without a separate electrical control, using gears only and changing the rotation direction of a driving motor of the facsimile machine.

SUMMARY OF THE INVENTION

Thus, an object of the present invention is to provide an improved device for changing the resolution of a facsimile.

Another object of the present invention is to provide an improved device for changing the resolution of a facsimile that converts the resolution, without a separate electrical control.

Another object of the present invention is to provide an improved device for changing the resolution of a facsimile that converts the resolution, without a separate electrical control, using gears only and changing the rotation direction of a driving motor of the facsimile.

Another object of the present invention is to provide a device for changing the resolution of a facsimile, which requires no separate hardware and electrical process in changing the resolution.

Another object of the present invention is to provide a device for changing the resolution of a facsimile, which changes the resolution only using gears, so as to reduce the facsimile cost.

Another object of the present invention is to provide a device for changing the resolution of a facsimile machine forming a high-resolution image.

Another object of the present invention is to provide a device for changing the resolution of a facsimile, which changes the resolution through a reliable and simple method, thereby overcoming the technical difficulties causing poor images, which are frequently resulted from a corresponding contemporary electrical process.

To achieve these and other objects of the present invention, there is provided a device for changing a resolution of a facsimile. This device may include at least three gears, including a first gear, a second gear for changing its driving path according to a rotation direction of the pinion gear; and third gear interlocked or separated with the first gear according to the rotation direction of the second gear. This changes the resolution.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT(S)

Reference will now be made in detail to the preferred embodiments of the present invention examples of which are illustrated in the accompanying drawings. For clarity, component reference numbers are consistent between all the drawings; such that, identical components in the present invention and those of prior art, are the same.

Figure 1:
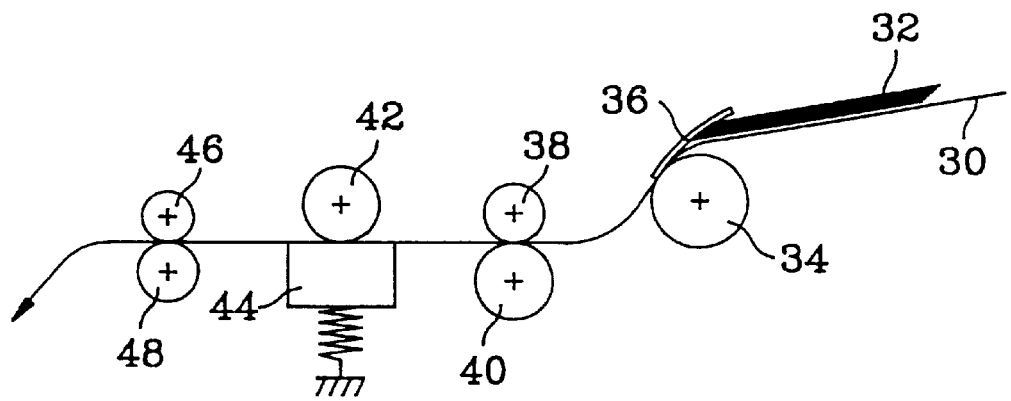
FIG. 1 is a diagram which shows a contemporary facsimile machine including a transmitter.

A transmission process of a contemporary facsimile machine is discussed below with reference to FIG. 1 showing a contemporary facsimile machine having a transmitter. When a document 32 is loaded on a document feeder 30, located in the upper portion of the facsimile, a document sensor senses document 32 and rotates a transmission motor (not shown). Because the friction between document 32 and an automatic feeding roller 34, driven by the driving power of a transmission motor, is larger than that between documents 32, or between document 32 and a rubber pad 36, document 32 is conveyed in the direction of a driving roller 40 by automatic feeding roller 34. Thereafter, document 32 is conveyed to a contact image sensor 44, for reading and transmitting data of the document. This is done using the rotation of driving roller 40 and a pinch roller 38. A white roller 42, located on contact image sensor 44, refers to reference data before reading data of document 32, and at the same time, contact image sensor 44 senses light reflected from white roller 42 using an optical sensor so as to read the reference data. Contact image sensor 44 codes, compresses, and transmits the data through a telephone line. Document 32, whose data is transmitted through the aforementioned process, is discharged from the facsimile by a discharging roller 48 and pinch roller 46. Then, document 32 is stacked on a document stack. This accomplishes (or completes) the transmission process.

In order to change its resolution in the facsimile process described in the previous paragraphs a reference resolution is mechanically realized, and a final resolution is electrically realized. Thus, the amount of information needed is obtained from data having the original resolution. A predetermined amount of the information is electrically added or subtracted. This creates a resolution different from the original.

Figure 2:
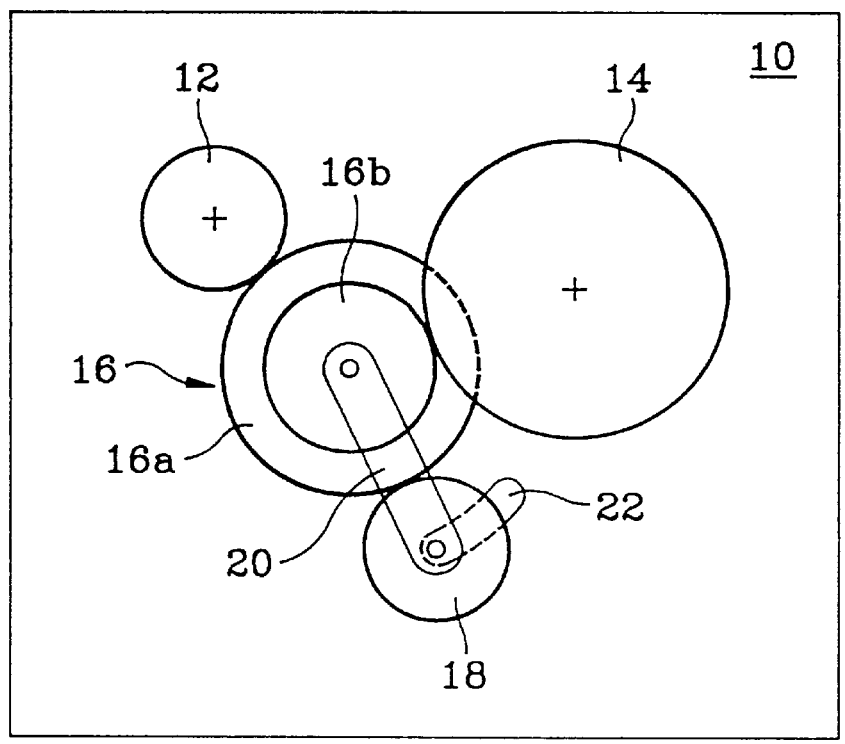
FIG. 2 shows a device for changing the resolution of a facsimile in accordance with the principles of the present invention.

There is an another way. FIG. 2 shows a device for changing the resolution of a facsimile according to the principles of the present invention. As shown in FIG. 2, a pinion gear 12 is located inside a facsimile machine of the present invention. This pinion gear permits the facsimile to change its resolution. The pinion gear is rotated clockwise or counterclockwise by the driving force of a driving motor. Pinion gear 12 is interlocked with a second gear 16 changing the driving path of a third gear 18 according to the rotation of pinion gear 12.

This second gear 16 is formed of a two-stage gear consisting of a gear A (16a) and gear B (16b). The gear A and gear B are connected to each other by an one-direction clutch. In this way, they turn together only when pinion gear 12 is rotated counterclockwise so as to transmit power to each other. They rotate independently while not transmitting power to each other when pinion gear 12 is rotated clockwise. One side of gear B (16b) is interlocked with a first gear 14 rotating driving roller 14 shown in FIG. 1, to convey document 32 to contact image sensor 44. One side of gear A (16a) is interlocked with first gear 14 when the gear A is rotated counterclockwise, but it is separated from first gear 14 when the gear A is rotated clockwise. The gear A is interlocked with third gear 18. Third gear 18 is connected to second gear 16 with a link 20. Thereby, this is interlocked with second gear 16. A hole 22 having a predetermined curvature is located in a predetermined portion of a frame 10 of the facsimile. When third gear 18 is interlocked or separated with first gear 14 according to the rotation of gear A (16a), the range of motion of third gear 18 is determined by hole 22.

As one may easily see from the previous paragraphs, a gear train having one speed reduction ratio can realize one resolution mechanically. To take the advantages from this insight, separate driving paths are provided, and a driving path is selected as needed, to thereby change the resolution The device of the present invention can select various driving paths, each of which has a separate resolution by changing the rotation direction of the driving motor.

Figure 3A:
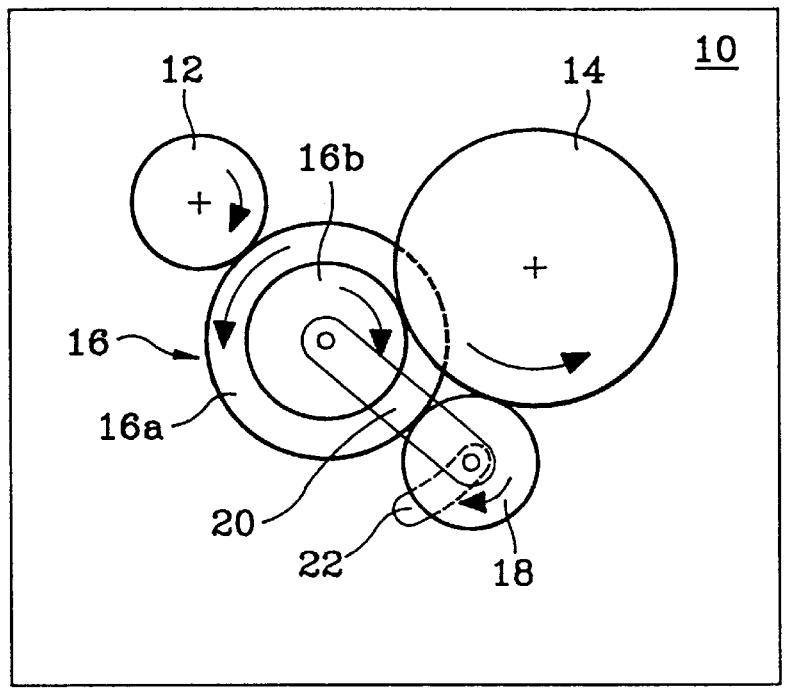
FIGS. 3A and 3B show operation states of a device for changing the resolution of a facsimile in accordance with the principles of the present invention.

By using the mechanisms described in the previous paragraphs, operation processes for changing the original resolutions can occur. Operation processes for changing the original resolution into resolutions of 300 dpi and 200 dpi according to the present invention can be as below. In case of 300 dpi, as shown in FIG. 3A, gear A (16a) is rotated counterclockwise if pinion gear 12 is rotated clockwise by the driving power of the driving motor. Gear B (16b) is rotated clockwise because it is connected to gear A (16a) with the one-direction clutch. Third gear 18 is rotated clockwise by the clockwise rotation of the gear A, and moved to the right. Thereafter, third gear 18 is interlocked with first gear 14. Thus, first gear 14 is rotated counterclockwise, and conveys a document. By doing so, data of the document forms an image having 300 dpi of resolution.

Figure 3B:
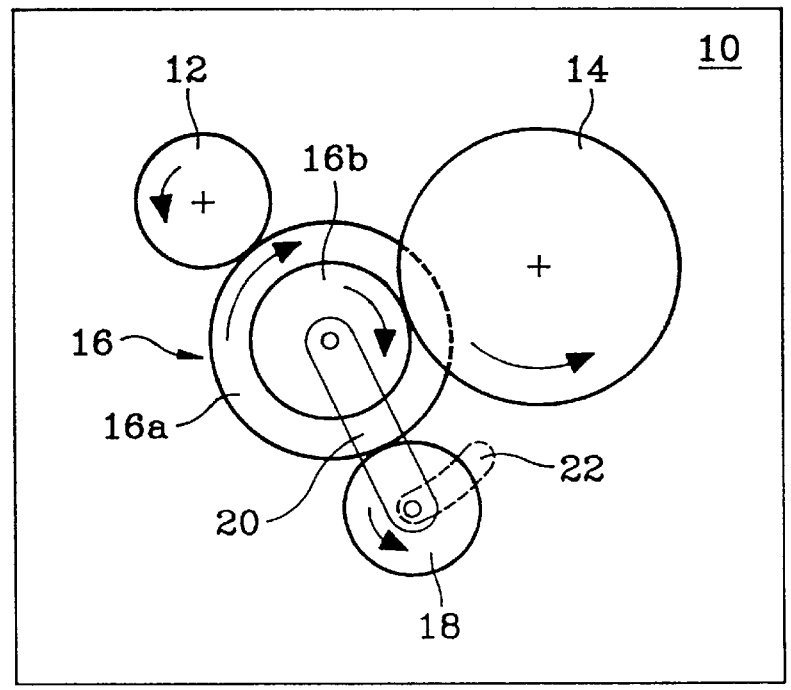

Analogously, in case that the resolution is converted from 300 dpi to 200 dpi, as shown in FIG. 3B, gear A (16a) is rotated clockwise if pinion gear 12 is rotated counterclockwise by the driving power of the driving motor. Gear B (16b)

is rotated clockwise like the gear A because it is connected to gear A (16a) with the one-direction clutch. Third gear 18 is rotated counterclockwise by the clockwise rotation of the gear A, separated from first gear 14, and moved to the left. Third gear 18 is moved to the end of hole 22 in frame 10. Simultaneously, first gear 14 is rotated counterclockwise by the clockwise rotation of the gear B, and conveys a document. Thus, data of the document forms an image having 200 dpi of resolution.

Thus, the present invention provides a device for changing the resolution of a facsimile. When it is required to change resolution in order to improve the function of facsimile, only the rotation direction of the driving motor is changed. Thus, this is done without employing a separate electrical device or software process. This reduces the facsimile cost. Further, this forms an image having a high-resolution. Furthermore, the present invention overcomes technical difficulties and poor image resulted from the contemporary conversion device employing the electrical process. Thus, the present invention permits to change a resolution with a reliable and simple method.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A device for changing a resolution of a facsimile operation of a facsimile machine, comprising:
    a contact image sensor reading, coding, compressing, and transmitting document data of the facsimile operation;
    a pinion gear driven by a motor for rotating in a first direction or a second direction;
    a first roller gear for rotating a driving roller to convey a document to said contact image sensor;
    a second roller gear rotating in second and first directions, respectively, in response to said first and second directions of said pinion gear;
    a third roller gear connected to said second roller gear and rotatable in only said first direction, said third roller gear being driven by said second roller gear only when said second roller gear is rotating in said first direction to drive said first roller gear in said second direction; and
    a fourth roller gear having a diameter smaller than said third roller gear, said fourth roller gear being driven by said second roller gear for driving said first roller gear in said second direction only when said second roller gear is rotating in said second direction.

2. The device of claim 1, wherein said first direction is clockwise and said second direction is counterclockwise.

3. The device of claim 2, wherein the resolution is converted from approximately 300 dpi to approximately 200 dpi as said pinion gear is rotated counterclockwise.

4. The device of claim 2, wherein the resolution is converted from approximately 200 dpi to approximately 300 dpi as said pinion gear is rotated clockwise.

5. The device of claim 1, wherein a hole is located at a predetermined portion of a frame of the facsimile machine, the hole preventing said fourth roller gear from deviating to the left when said fourth roller gear is interlocking with and separating from the first roller gear in dependence upon directions of rotation of said second roller gear.

6. The device of claim 5, wherein the hole is has a form of grove having a predetermined curvature.

7. The device of claim 1, wherein said second roller gear and said third roller gear are concentric.

8. The device of claim 7, further comprising:
    a member connecting a shaft of said third roller gear to a shaft of said fourth roller gear; and
    a frame perforated by an arcuate slot enabling said fourth roller gear to come into contact with said first roller gear depending upon the direction of rotation of said pinion gear.

9. The device of claim 8, wherein said fourth roller gear is in contact with said first roller gear when said second gear rotates in said second direction and said fourth roller gear is not in contact with said first roller gear when said second gear rotates in said first direction.

10. A device for changing a resolution of a facsimile operation of a facsimile machine, comprising:
    a contact image sensor reading, coding, compressing, and transmitting document data of the facsimile operation;
    a pinion gear rotated by driving power of a driving motor;
    first roller gear rotating a driving roller to convey a document to said contact image sensor;
    second roller gear changing a driving path of said second roller gear in dependence upon directions of rotation of said pinion gear; and
    third roller gear changing the resolution of the facsimile operation by interlocking with and separating from the first roller gear in dependence upon directions of rotation of said second roller gear, wherein said second roller gear has a two-stage gear consisting of two gear members, the two-stage gear simultaneously interlocking said first and third roller gear, wherein the two gear members of the two-stage gear are connected to each other with a single-direction clutch permitting an operation in one direction, the two gear members being united with each other and transmit power to each other when said pinion gear is rotated in a first direction of rotation of said pinion gear, and the two members are rotated independently and are not transmitting power to each other when said pinion gear is rotated in a second direction of rotation of said pinion gear.

11. The device of claim 10, wherein the first direction of rotation of said pinion gear is counterclockwise.

12. The device of claim 11, wherein the resolution is converted from approximately 300 dpi to approximately 200 dpi as said pinion gear is rotated counterclockwise.

13. The device of claim 10, wherein the second direction of rotation of said pinion gear is clockwise.

14. The device of claim 13, wherein the resolution is converted from approximately 200 dpi to approximately 300 dpi as said pinion gear is rotated clockwise.

15. The device of claim 10, wherein a hole is located at a predetermined portion of a frame of the facsimile machine, the hole preventing said third roller gear from deviating to the left when said third roller gear is interlocking with and separating from said first roller gear in dependence upon directions of rotation of said second roller gear.

16. A method for changing a resolution of a facsimile operation of a facsimile machine, comprising the steps of:
    rotating a pinion gear in a first direction or a second direction opposite to said first direction by a motor capable of rotating in opposite directions;
    rotating a first gear in a second direction or a first direction, respectively, in response to said first and said second directions of said pinion gear;
    rotating a second roller gear connected to said first roller gear and rotatable in only said first direction, said second roller gear being driven by said first roller gear only when said first roller gear is rotating in said first direction;

rotating a third gear having a diameter smaller than said second roller gear, said third roller gear being driven by said first roller gear; and rotating a fourth roller gear by said third roller gear whenever said first roller gear is rotating in said second direction, and rotating said fourth roller gear by said second roller gear whenever said first roller gear is rotating in said first direction.

17. The method of claim 16, further comprising the step of:

rotating a driving roller to convey a document to a contact image sensor by the rotation of said fourth roller gear.

18. The method of claim 17, further comprising the step of:

translating a shaft of said third roller gear along a slot in a frame causing said third roller gear to be in contact with said fourth roller gear only whenever said first roller gear is rotating in a second direction and causing said third gear not to be in contact with said fourth roller gear whenever said first roller gear is rotating in said first direction.

19. The method of claim 18, wherein said first direction is clockwise and said second direction is counterclockwise.

* * * * *